United States Patent Office 3,770,798
Patented Nov. 6, 1973

3,770,798
STABILIZATION OF BETA-
AMINOPROPIONITRILES
Richard V. Norton, Wilmington, Del., assignor to Sun
Research and Development Co., Philadelphia, Pa.
No Drawing. Filed Jan. 20, 1972, Ser. No. 219,560
Int. Cl. C07c 121/42
U.S. Cl. 260—465.5 R        20 Claims

ABSTRACT OF THE DISCLOSURE

Liquid β-aminopropionitriles are protected against thermal decomposition by the addition of a stabilizing amount of an acid selected from the group of organic carboxylic and sulfonic acids.

---

The reaction of amines with acrylonitrile to form β-aminopropionitriles is well known and it is further recognized that is is an equilibrium reaction:

$$RNH_2 + CH_2=CHCN \rightleftharpoons RNHCH_2CH_2CN$$

In using this reaction with ammonia or alkanolamines such as ethanolamine (e.g., R=H or $HOCH_2CH_2$—) to obtain liquid products and subsequently purifying the product by distillation, it is frequently found that extensive decomposition and tar formation occurs accompanied by ammonia evolution. Consequently, the yield of liquid β-aminopropionitrile is often very low and distillation is not an appropriate recovery or purification technique for these products. This problem is recognized in the art and is reported by F. C. Whitmore in J.A.C.S. 66 725 (1944). He indicates that decomposition occurs when such addition products are heated near their boiling point and he adds that attempted distillation "gives back all of the diethanolamine used as starting material and leaves only a non-distillable polymer." It is also recognized in the art that these compounds are frequently unstable to storage (Organic Synthesis, Coll. vol. 3, p. 93).

It has now been found that β-aminopropionitriles obtained as reaction products of acrylonitrile with ammonia or alkanolamines are stabilized against thermal degradation and also have their storage stability improved by the addition of a small amount of a carboxylic or sulfonic organic acid. The β-amino-propionitriles which may be stabilized in accord with the invention may be defined structurally as $R_1$—NH—$CH_2CH_2CN$ where $R_1$ is hydrogen, hydroxy lower alkyl, or amino lower alkyl; e.g., hydroxyethyl, hydroxypropyl, hydroxybutyl, aminoethyl, aminopropyl, etc. The acids useful in the invention are, as indicated, carboxylic and sulfonic and are preferably those of structure $R_2$(COOH)$_n$ and $R_2$(SO$_3$H)$_n$ where $R_2$ is a lower alkyl or alkylene group (e.g., one to about six carbon atoms), a halogen substituted lower alkyl group, an aryl group, preferably a hydrocarbon aryl group of from six to twelve carbon atoms, lower alkyl, halogen and lower alkoxy substituted aryl groups as above defined, and $n$ is a small integer such as 1, 2, or 3. Typical acids useful in the invention include carboxylic acids such as acetic, chloracetic, trifluoroacetic, propionic, the isomeric butyric, pentanoic and hexanoic acids, oxalic, malonic, succinic, glutaric, adipic, benzoic, the isomeric toluic acids, o-chlorobenzoic, p-bromobenzoic, m-iodobenzoic, terephthalic, isophthalic, anisic, 1,3-naphthalene dicarboxylic, benzensulfonic, p-toluenesulfonic, 4 - ethylbenzenesulfonic, 2,5-dimethylbenzenesulfonic, 1,5-naphthalenedisulfonic acid, m-benzenedisulfonic, 1,2-ethanedisulfonic, and the like. The amount of acid added to the β-aminopropionitrile will generally be from about 1% to about 5% by weight of the nitrile and preferably from about 1% to about 3%.

The greatest benefit in improved thermal stability is imparted to those β-aminopropionitriles where $R_1$ in the above formula is hydroxy lower alkyl or amino lower alkyl. However, where $R_1$ is H, significant storage stability improvement is achieved by the invention. For this latter purpose, it is merely necessary to incorporate the acids as defined above at the levels referred to and in this manner decomposition during storage is significantly reduced.

In order to further illustrate the invention, the following examples are given:

EXAMPLE 1

Acrylonitrile (52 g., 0.98 mole) was added dropwise over a ninety minute period to distilled ethanolamine (128.7 g., 2.11 moles) with stirring and cooling in the manner of Surrey and Hammer (J.A.C.S., 72, 1814 (1950)). The excess ethanolamine distillation was made in vacuo at 40° C. and 0.3–0.4 mm. Hg. The end of ethanolamine distillation was recognized by a rapid rise in pot temperature to 71° C. and the concurrent evolution of ammonia vapors followed by the loss of vacuum to 0.8 Hg.

The crude product (125.5 g.) ws transferred to a microshort path still and vacuum of 0.02 mm. Hg was applied at 25° C., but by gradually increasing the pot temperature to effect distillation, there resulted a loss of vacuum to ~0.8 mm. due to ammonia release which was evident in the exhaust of the vacuum pump.

A portion (23.7 g.) of the crude product was again subjected to distillation of 0.02 mm. (initial). By using the smaller quantity of crude material, the vacuum pump was able to stay ahead of gas evolution, thereby obtaining 1.1 ml. of β-(2-hydroxyethylamino)-propionitrile with a boiling range of 55–105° C./0.2–0.4 mm. Hg.

The remaining crude product (100.2 g.) was again subjected to vacuum distillation using an oil diffusion pump in series with the mechanical pump. As the temperature was raised from 33° C. to 76° over a 115-minute period, decomposition of the product was obvious until finally 80 g. of a black pot residue was obtained.

It is clear from the above example that the β-(2-hydroxyethylamino)-propionitrile is quite unstable to distillation and cannot be obtained in high yield or purified by distillation techniques.

EXAMPLE 2

Portions of the crude N-cyanoethylated product derived from ethanolamine (48.8 g. mole) and acrylonitrile (53 g., 1 mole), after vacuum stripping the excess acrylonitrile, were tested for thermal stability with approximately 1% by weight of nitrile with the following additives:

(a) Sodium hydroxide resulted in an increased rate of darkening color and ammonia evolution at reflux.

(b) Zinc chloride had little noticeable affect, i.e., it did not retard or accelerate the decomposition.

(c) Acetic acid greatly retarded decomposition at 125° C.

(d) p-Toluenesulfonic acid had a stabilizing effect equivalent to acetic acid.

(e) Terephthalic acid was as effective as acetic acid at 125° C.

EXAMPLE 3

A master batch of β-(2 - hydroxyethylamino)-propionitrile was prepared from acrylonitrile (1.5 moles) and ethanolamine (1.5 moles) at 20° C., and the following distillation experiments performed:

A master batch of β-(2-hydroxyethylamino)-propio- in a 100 ml. distillation assembly and vacuum of 0.05 mm. Hg at 25° C. was stabilized. Slowly increasing the pot temperature resulted in a steady loss of vacuum until at 100° C. and 3 mm. Hg, the experiment was ended because the flask contents had turned black and typical of a polymeric residue.

(B) Glacial acetic acid (3.2 g.) was added to another sample (43 g.) of the crude product and distillation was attempted in the manner of (A). In this way 27 g. of β-(2 - hydroxyethylamino)-propionitrile distilled smoothly at 110° C. at 0.15 mm. Hg before decomposition of the remaining pot sample set in.

(C) Aqueous hydrochloric acid (2.1 g.) was added to 34 g. of the crude product and distillation again attempted. Only about 2 ml. of β-(2-hydroxyethylamino)-propionitrile was recovered at 121° C. and 0.3 mm. Hg before pot decomposition occurred.

(D) p-Toluenesulfonic acid (1.5 g.) was added to 43 g. of crude product and distillation was attemped in the manner of the previous examples. There was obtained 10.2 g. of β - (2 - hydroxyethylamino)-propionitrile boiling at 119° C. at 0.21 mm. Hg before pot decomposition occurred preventing further recovery.

(E) Sulfuric acid (4.0 ml.) was added to 32.4 g. of the crude product and distillation again attempted. No product was recovered.

EXAMPLE 4

A master batch of 3 - (2 - aminoethylamino)-propionitrile ($H_2NCH_2CH_2NHCH_2CH_2CN$) was prepared from acrylonitrile (1.0 moles) and ethylenediamine (1.0 moles) by allowing the solution to react for 24 hours at 25° C. in accord with the method of Dickerman & Simon, J. Org. Chem. 22, 259 (1957).

(A) A sample of the crude product (28 g.) placed in a 100 ml. distillation assembly under a vacuum of 0.05 mm. was distilled by gradually increasing the pot temperature. The product distilled at 85–90° (0.05–1.0 mm.) but the experiment was terminated after 8 g. of product were collected and the pot temperature rose at 124–127° at 10 mm. Hg with vigorous ammonia evolution occurring. A 29% yield of nitrile product was realized.

(B) Propionic acid (2.1 g.) was added to 50 g. of the crude product and distillation was repeated in the manner of (A). In this way, 37 g. of 3-(2-aminoethylamino)-propionitrile was obtained with a B.P. of 100–105° (1 mm. Hg) which represented a 74% molar yield.

(C) When sulfuric acid (1.7 g.) was added to 38 g. of the crude product and distillation attempted, extensive decomposition occurred and no product was isolated.

EXAMPLE 5

A master batch of β-(2-hydroxy - 2 - methylpropylamino)-propionitrile was prepared by allowing 1-amino-2-methyl-2-propanol (1 mole) $(CH_3)_2C(OH)CH_2NH_2$ to react with acrylonitrile overnight at 25° C. in accord with the method of Steck, Hallock and Suter, J.A.C.S. 70, 4063 (1948).

(A) Distillation of a sample (30 g.) of the master batch in the manner of Example 3A yielded 25 g. of pure product representing an 83% yield.

(B) Trifluoroacetic acid (1.1 g.) was added to 87 g. of the above crude product and distillation accomplished at 82–84° C. at 0.5 mm. Hg. There was obtained 83 g. of pure product representing a 95.5% yield.

EXAMPLE 6

A master batch of β-aminopropionitrile was prepared from acrylonitrile and ammonia by the method of Buc, Organic Synthesis, Coll. vol. 3, p. 93. The crude primary amine distilled over a range of 70°–120° C./18 mm. The master batch of crude β-aminopropionitrile was set aside for two days and then the following experiments were done.

(A) A sample of the crude product (17 g.) was distilled from a 50 ml. apparatus under 18–21 mm. vacuum which resulted in a yield of 8 g. (47%) of β-aminopropionitrile which boiled at 87–89° C./20 mm. Hg.

(B) Methane sulfonic acid (0.17 g.) added to the crude β-aminopropionitrile (17 g.) followed by immediate distillation yielded 13 g. of purified product representing a 76% yield.

(C) Benzenesulfonic acid (0.19 g.) added to 17 g. of the crude master batch and distilled in the manner as in (A) yielded 14 g. (82%) of purified β-aminopropionitrile.

(D) Anisic acid (2.1 g.) added to 50 g. of the master batch of crude β-aminopropionitrile and immediately distilled from a 100 ml. distillation apparatus yield 37 g. (76% yield) of purified β-aminopropionitrile.

The invention claimed is:

1. In the process of distilling a liquid β-aminopropionitrile of the structure $R_1$—NH—$CH_2CH_2CN$ where $R_1$ is hydrogen, hydroxy lower alkyl, or amino lower alkyl, the improvement of protecting said nitriles against thermal decomposition by adding a stabilizing amount of an acid of structure $R(COOH)_n$ or $R(SO_3H)_n$ were R is a lower alkyl, a halogen substituted lower alkyl, or an alkylene group of from 1 to about 6 carbon atoms, an aryl group of from six to twelve carbon atoms, a lower alkyl substituted, halogen substituted, or a lower alkoxy substituted aryl group, and $n$ is a small integer from 1 to 3.

2. The process of claim 1 where the amount of acid added is from about 1% to about 5% by weight of said nitrile.

3. The process of claim 2 where the acid is acetic acid.

4. The process of claim 2 where the acid is p-toluenesulfonic acid.

5. The process of claim 2 where the acid is terephthalic acid.

6. The process of claim 2 where the nitrile is β-aminopropionitrile.

7. The process of claim 2 where the nitrile is β-(2-hydroxyethylamine)-propionitrile and the amount of acid added is from about 1% to about 3% by weight of said nitrile.

8. The process of claim 7 where the acid is acetic acid.

9. The process of claim 7 where the acid is p-toluenesulfonic acid.

10. The process of claim 7 where the acid is terephthalic acid.

11. The process of claim 1 where the nitrile is 3-(2-aminoethylamino)propionitrile, the amount of acid added is from about 1% to about 3% by weight of said nitrile and the acid is propionic acid.

12. The process of claim 2 where the nitrile is β-(2-hydroxy-2-methylpropylamino)propionitrile and the acid added is acetic acid.

13. A liquid β-aminopropionitrile composition stabilized against decomposition comprising a nitrile of the structure $R_1$—NH—$CH_2CH_2CN$ where $R_1$ is hydrogen, hydroxy lower alkyl, or amino lower alkyl, and from 1% to about 5% by weight of said nitrile of an acid of structure $R(COOH)_n$ or $R(SO_3H)_n$ where R is a lower alkyl, a halogen substituted lower alkyl, or an alkylene group of from 1 to about 6 carbon atoms, an aryl group of from six to twelve carbon atoms, a lower alkyl substituted, halogen substituted, or lower alkoxy substituted aryl group, and $n$ is a small integer from 1 to 3.

14. The composition of claim 13 where the nitrile is β-(2-hydroxyethylamino)propionitrile.

15. The composition of claim 14 where the acid is acetic acid.

16. The composition of claim 14 where the acid is terephthalic acid.

17. The composition of claim 14 wherein the acid is p-toluenesulfonic acid.

18. The composition of claim 13 where the nitrile is 3-(2-aminoethylamino)propionitrile and the acid is propionic acid.

19. The composition of claim 13 where the nitrile is β-(2-hydroxy-2-methylpropylamino)-propionitrile and the acid is trifluoroacetic.

20. The composition of claim 13 where the nitrile is β-aminopropionitrile.

References Cited
UNITED STATES PATENTS

| | | | |
|---|---|---|---|
| 3,655,519 | 4/1972 | Scherhag | 203—6 |
| 3,155,601 | 11/1964 | Idol, Jr. | 260—465.3 R |

JOSEPH P. BRUST, Primary Examiner

U.S. Cl. X.R.

203—6